(12) United States Patent
Evans et al.

(10) Patent No.: US 6,971,690 B2
(45) Date of Patent: Dec. 6, 2005

(54) BUMPER SYSTEM WITH "W" BEAM AND ENERGY ABSORBER

(75) Inventors: Darin Evans, Wixom, MI (US); Thomas J. Johnson, Allendale, MI (US); Robert J. Dornbos, Hudsonville, MI (US); Mark P. White, Muskegon, MI (US)

(73) Assignee: NetShape International, LLC, Novi, MI (US)

( * ) Notice: Subject to any disclaimer, the term of this patent is extended or adjusted under 35 U.S.C. 154(b) by 0 days.

(21) Appl. No.: 10/864,559

(22) Filed: Jun. 9, 2004

(65) Prior Publication Data

US 2004/0256867 A1 Dec. 23, 2004

Related U.S. Application Data

(60) Provisional application No. 60/479,623, filed on Jun. 18, 2003.

(51) Int. Cl.[7] .............................................. B60R 19/02
(52) U.S. Cl. ...................... 293/102; 293/120; 293/136
(58) Field of Search ................................ 293/102, 120, 293/121, 136, 132, 122; 296/187.03; 256/13.1

(56) References Cited

U.S. PATENT DOCUMENTS

| 3,854,765 | A | * | 12/1974 | Church et al. .............. 293/136 |
| 4,413,856 | A | * | 11/1983 | McMahan et al. ..... 296/187.03 |
| 4,533,166 | A | * | 8/1985 | Stokes ......................... 293/120 |
| 4,573,724 | A | * | 3/1986 | Campen ....................... 293/136 |
| 4,822,011 | A | * | 4/1989 | Goldbach et al. ........... 293/136 |
| 4,904,008 | A | * | 2/1990 | Glance ......................... 293/102 |
| 5,385,375 | A | * | 1/1995 | Morgan et al. .............. 293/122 |
| 5,441,319 | A | * | 8/1995 | Oyama et al. ............... 293/102 |
| 5,967,592 | A | * | 10/1999 | Freeman ...................... 293/120 |
| 6,416,041 | B1 | * | 7/2002 | Sicking et al. .............. 256/13.1 |
| 6,435,579 | B1 | * | 8/2002 | Glance ......................... 293/102 |
| 6,485,072 | B1 | * | 11/2002 | Werner et al. ............... 293/132 |
| 6,663,150 | B1 | * | 12/2003 | Evans .......................... 293/120 |
| 6,746,061 | B1 | * | 6/2004 | Evans .......................... 293/120 |
| 6,877,785 | B2 | * | 4/2005 | Evans et al. ................. 293/120 |

* cited by examiner

*Primary Examiner*—Kiran B. Patel
(74) *Attorney, Agent, or Firm*—Price, Heneveld, Cooper, DeWitt & Litton LLP

(57) ABSTRACT

A bumper system includes a "W" or "C" shaped beam having a back wall and mounts along the back wall adapted for attaching the beam to rails of a vehicle frame. An energy absorber engages a face of the beam and has rearwardly-extending energy-absorbing sections that extend through the face into contact with the back wall at each of the mounts for improved energy absorption. The horizontal walls of the beam have front and rear sections that align, but also have a U-shaped intermediate section that weakens the walls for promoting a more uniform and predictable collapse. A one-piece brace includes diagonal straps that hold free ends of top and bottom walls together to prevent premature spreading apart upon impact. The energy absorber includes energy-absorbing sections that extend past the straps to detentingly engage the intermediate sections of the beam.

10 Claims, 3 Drawing Sheets

BUMPER SYSTEM WITH "W" BEAM AND ENERGY ABSORBER

CROSS-REFERENCE TO RELATED APPLICATIONS

This application claims benefit of provisional application Ser. No. 60/479,623, filed Jun. 18, 2003, entitled BUMPER SYSTEM WITH "W" BEAM AND ENERGY ABSORBER.

BACKGROUND

The present invention relates to bumper systems, and more particularly relates to a bumper system including a beam and energy absorber components for optimally absorbing energy during a vehicle impact. The illustrated beam has a "W" shaped cross section, but the present concepts are not believed to be limited to only a "W" section.

It is desirable to provide a bumper system that optimally manages energy absorption by providing for maximum energy absorption during a vehicle crash, yet that does so without overloading the vehicle's frame. Managing energy at the bumper-to-vehicle-frame mounts is especially critical, since this is the area where loads are communicated to the vehicle's frame during a crash. However, the beam must also not prematurely kink or unpredictably bend in areas between the frame mounts, so that impact loads are well distributed over time and maintained under a maximum amount of force. This is necessary so that all vehicles in a particular model line meet minimum Federal Vehicle Motor Vehicle Safety Standards and manufacturers' requirements, despite unavoidable manufacturing and assembly variations. Minimizing a weight of bumper systems is also important in order to meet gas mileage and vehicle class goals.

Tubular bumper beams are often used because they tend to distribute stress and resist premature kinking and unpredictable bending. Also, tubular bumper beams have a particularly high strength-to-weight ratio due to inherent properties associated with a tubular shape. However, tubular bumper beams are not inexpensive. For example, tubular bumper beams must be welded along a continuous strip extending a full length of the beam, which costs money, time, and material; requires substantial investment in welding equipment; can slow a rollforming process down; and can lead to heat-related distortions and non-uniformities resulting in non-linear beam shapes. Still further, minimizing a weight of bumper systems continues to be important. It would be desirable if a bumper beam could be made having a more conventional non-tubular open shape, yet that maintained a strength and properties of a tube. One problem of non-tubular beams is that their flanges tend to spread apart during an impact, such that their beam strength is quickly lost due to kinking and premature bending. A beam is desired not having this problem. Also, a beam is desired that will reduce load spikes that occur during a vehicle crash.

Thus, a bumper system having the aforementioned advantages and solving the aforementioned problems is desired.

SUMMARY OF THE PRESENT INVENTION

In one aspect of the present invention, a bumper system for vehicles includes a beam having a back wall and mounts along the back wall that are adapted for attaching the beam to rails of a vehicle frame. An energy absorber engages a face of the beam and has rearwardly-extending energy-absorbing sections that extend through the face of the beam into contact with the back wall at each of the mounts.

In another aspect of the present invention, a bumper system for vehicles includes a beam having an open-sided cross section with top and bottom walls that are substantially parallel. A brace includes straps that extend diagonally back and forth between the top and bottom walls and that are securely attached to free ends of the top and bottom walls to secure the top and bottom walls together in a manner that prevents spreading apart upon a vehicle impact.

In another aspect of the present invention, a bumper system for vehicles includes a beam having at least two parallel walls that extend generally horizontally when in a vehicle-mounted position. Each of the parallel walls have front and rear sections that generally align, and a radiused intermediate section extending between the front and rear sections that is bent out of alignment with the front and rear sections to form a predetermined weakened location that will predictably collapse when impacted during a vehicle crash.

In another aspect of the present invention, a method comprises steps of forming an open-sided beam having top and bottom walls that extend generally in a parallel direction, stamping a one-piece strap having multiple diagonal strap sections, and attaching the strap to the shaped beam to retain free ends of the top and bottom walls together.

The present invention further includes methods related to any of the above concepts.

Advantageously, the present arrangement is lightweight, since the straps are minimal in weight, and yet the beam is strong, since the straps connect the horizontal walls of the beam together to prevent premature failure of the beam upon front impact. The components of the assembly are relatively easily made and secured together, such that assembly time and cost is minimized. Advantageously, the beam is stable even if impacted at an angle, due to the diagonal "truss-like" stability created by the diagonal straps. The energy-absorbing sections of the energy absorber that extend into the beam create additional stability. Further, the sequence caused upon a frontal impact results in a very predictable, stable, reliable crush, and results in excellent energy absorption and communication of controlled amounts of stress through the bumper system to the vehicle frame.

These and other aspects, objects, and features of the present invention will be understood and appreciated by those skilled in the art upon studying the following specification, claims, and appended drawings.

DETAILED DESCRIPTION OF PREFERRED EMBODIMENTS

A bumper system 20 (FIG. 1) combines a rollformed metal W-shaped beam 21, a stamped metal brace 37 welded to an open side of beam 21, and a polymeric energy absorber 32 to form a novel energy absorbing system having reduced weight, reduced manufacturing cost, and excellent energy absorption, as described below.

Figure 1:
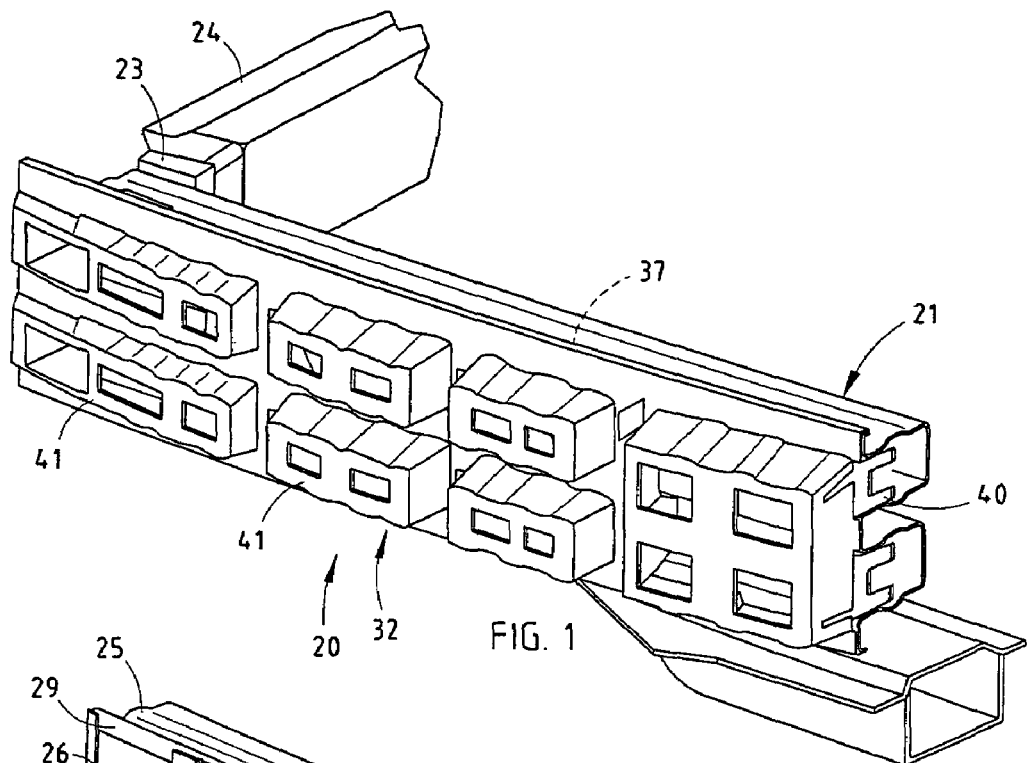
FIG. 1 is a partial perspective view of a left portion of a bumper system attached to a vehicle frame, the bumper system including a W-shaped metal beam attached to a vehicle frame rail, and a polymeric energy absorber attached to a front of the beam.
Figure 6:
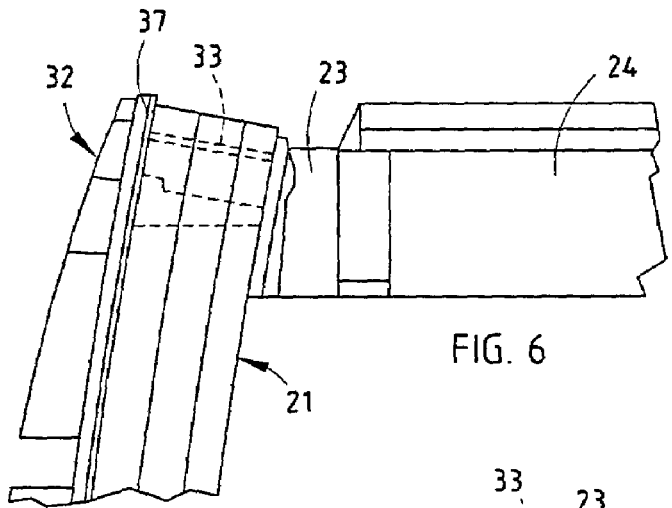
FIGS. 6–7 are top fragmentary views of an end of the bumper system shown in FIG. 1, FIG. 6 showing the system prior to impact and FIG. 7 showing the system during impact.
Figure 7:
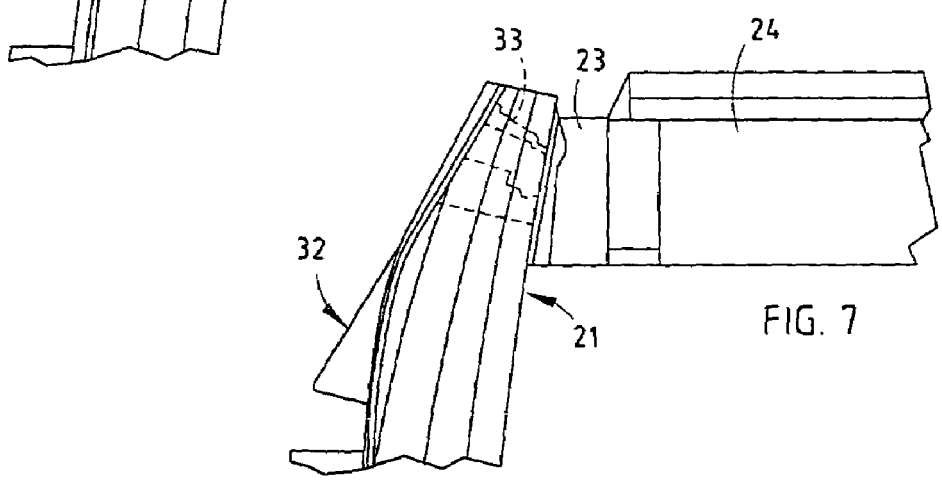

The W-shaped beam 21 has a back wall 22 formed by back sections 22A and 22B, and has mounts 23 along the back wall 22 adapted for attaching the beam 21 to rails 24 of a vehicle frame. The beam 21 also includes four forwardly-extending horizontal parallel walls 25–28, and a face formed by front walls 29–31. The front walls 29–31 provide sufficient frontal surface area to satisfactorily engage and support the energy absorber 32, as shown in FIG. 1. The energy absorber 32 engages the face of the beam 21 and has rearwardly-extending energy-absorbing end sections 33 that extend through the face into contact with the back wall 22 at each of the mounts 23 (i.e. at ends of the beam 21, and at corners of the vehicle) for improved energy absorption and transmission of energy into the vehicle frame rails 24. As shown by the force versus deflection chart of FIG. 5, and also by the "pre" and "post" impact positions of the bumper system in FIGS. 6–7, this provides excellent crush strength and energy absorption. The sections 33 also support and stabilize the walls 25–28 relative to each other during impact, which adds to energy absorption and to a more predictable collapse.

Figure 2:
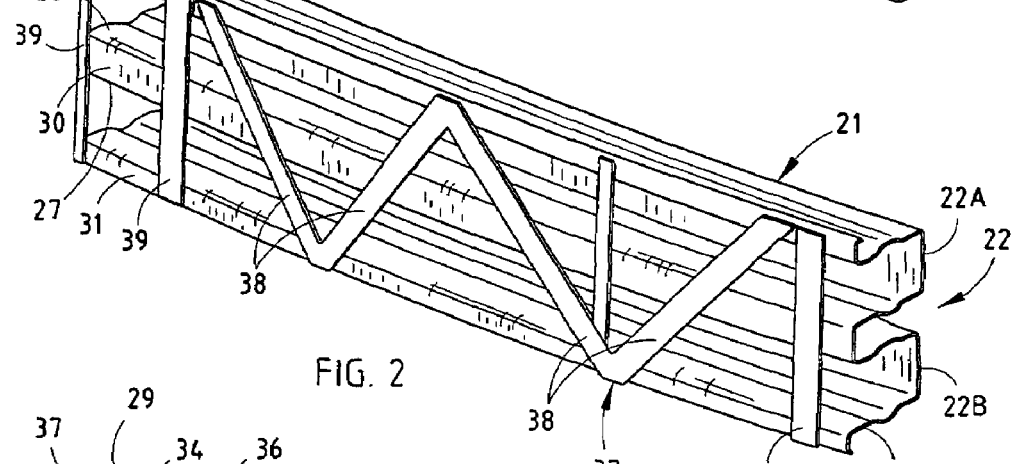
FIG. 2 is a front perspective view the beam shown in FIG. 1.
Figure 2A:
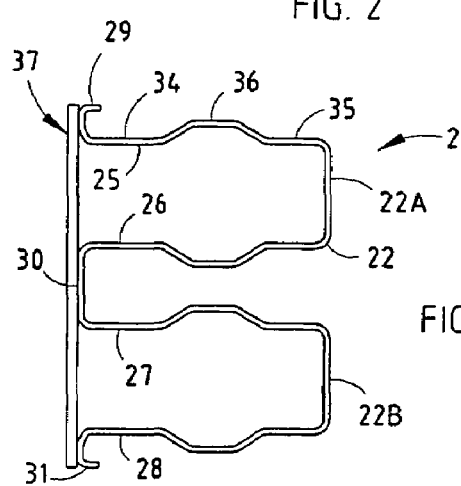
FIG. 2A is an enlarged cross-sectional view of the cross section of the beam.
Figure 3:
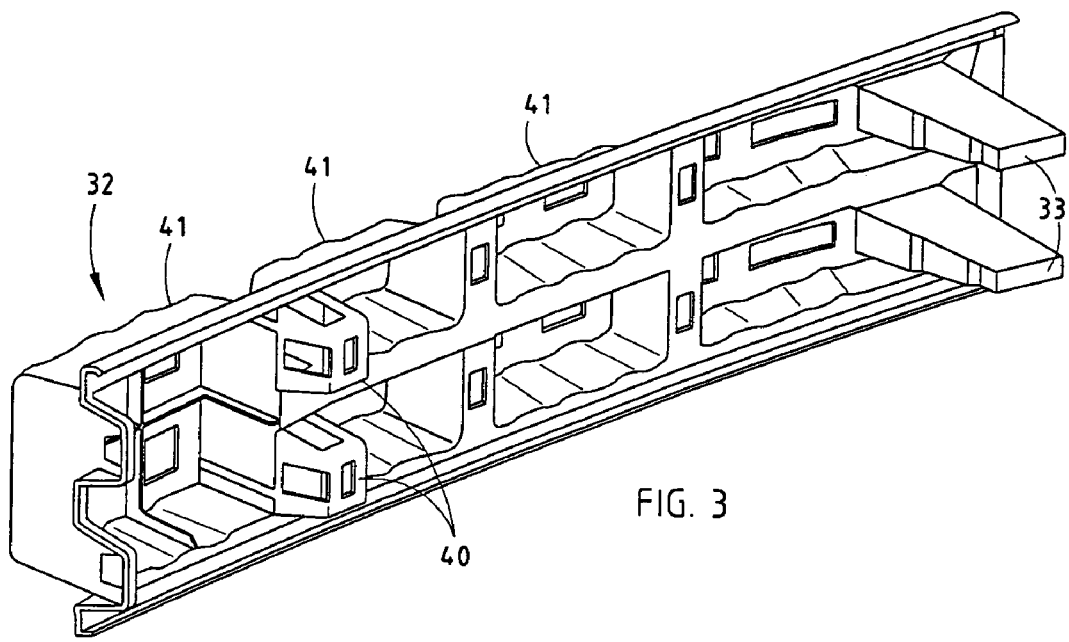
FIGS. 3–4 are rear and front views of the energy absorber shown in FIG. 1.
Figure 4:
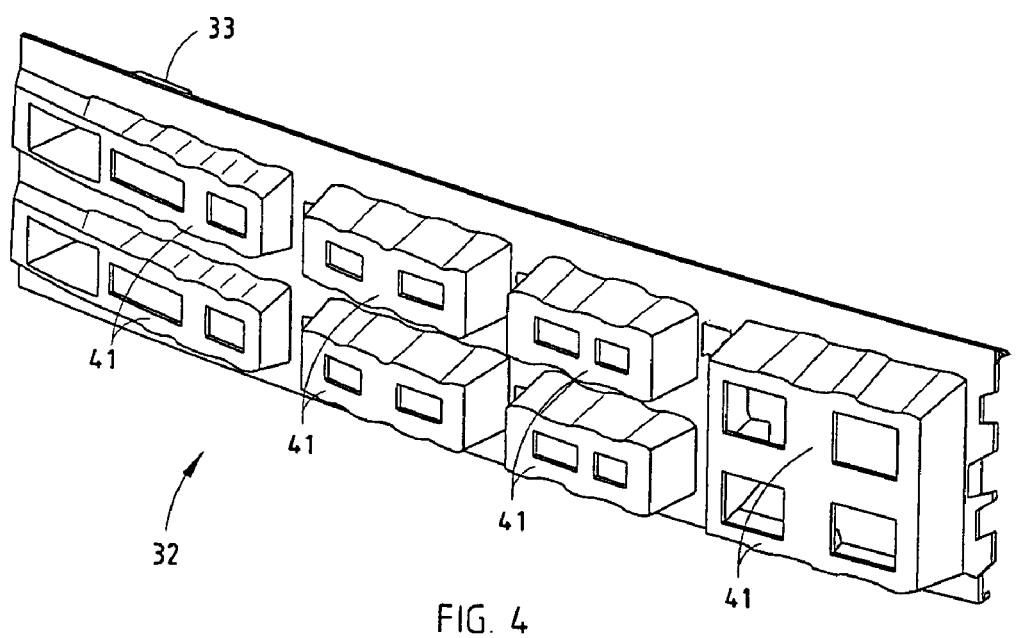
Figure 5:
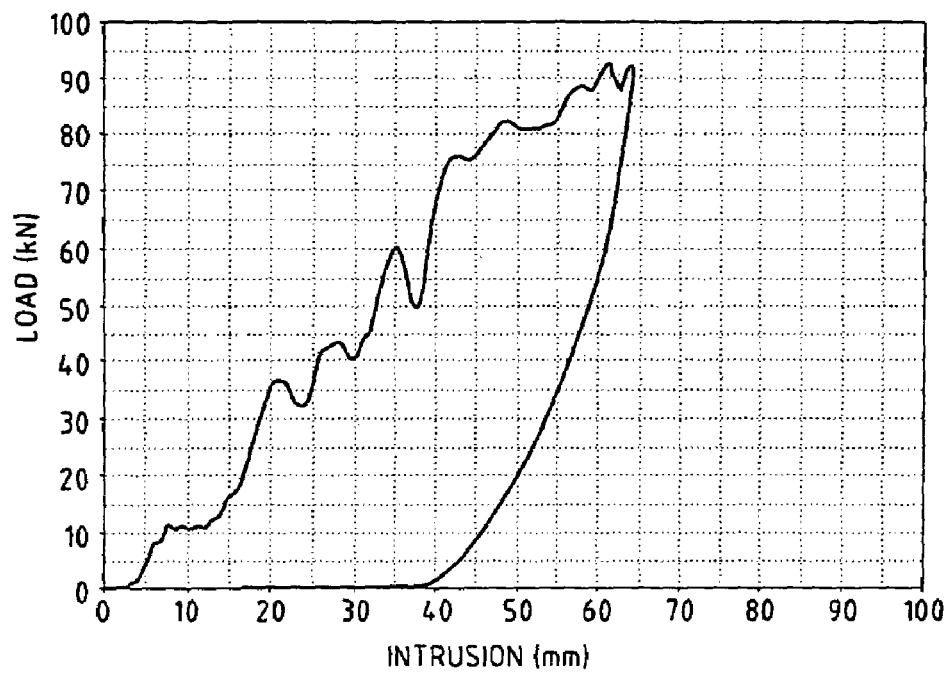
FIG. 5 is graph showing the load versus deflection results of a test of the bumper system of FIG. 1.

The horizontal walls 25–28 of the beam 21 each have front and rear sections 34 and 35 (FIG. 2A) that generally align, but also have a U-shaped intermediate section 36 connecting the sections 34–35 that extend longitudinally. The intermediate sections 36 weaken the walls 25–28 for promoting a more uniform and predictable collapse upon frontal impact, as shown by FIG. 5. It is noted that the shape of beam 21 allows the beam to be rollformed to an accurate shape. Further, a shape of the beam 21 can be closely controlled when the brace 37 is welded to the beam 21, thus further helping with dimensional accuracy. Also, it is conceived that the energy absorber 32 can include lateral bumps that engage the intermediate sections 36 to retain the energy absorber 32 to the beam 21.

The brace 37 (FIG. 2) includes a one-piece portion formed by diagonal straps 38. This portion can be stamped from a sheet of steel. The angled or diagonal straps 38 allow a plurality of the one-piece portions to be stamped adjacent each other such that there is little or no waste in the raw sheet of steel. The straps 38 are welded to the beam 21 at multiple locations to hold free ends of the top and bottom walls 25, 26, 27, and 28 together to prevent premature spreading apart upon impact. The diagonal direction of the angled portions of the strap provide a truss-like structure with the beam 21 that is very stable in multiple directions. The brace 37 further includes a pair of parallel straps 39 at each end that create a space therebetween for receiving the end sections 33 of the energy absorber 32. This arrangement acts to contain and control the end sections 33 during a vehicle front/corner impact. The energy absorber 32 further includes partial-depth energy-absorbing sections 40 that extend past and between the straps 38 to a depth of the intermediate sections 36 of the beam. The sections 40 stabilize the energy absorber 32 on a face of the beam 21, so that the energy absorber 32 does not tend to slip up or down off the beam 21 during frontal impact. Notably, if an energy absorber 32 slips up or down, its energy absorbing capability is substantially diminished. Still further, the energy absorber includes crush boxes 41 that engage a face of the beam 21 and provide yet additional control and impact energy management. The crush boxes 41 are box-shaped to include four orthogonal sidewalls and an apertured front wall, but include a rearwardly-open rear side. The walls of the crush boxes 41 can be flat or wavy in shape. The boxes 41 are supported by the front walls 29–31 and by the straps 38–39 of the brace 37.

Due to the minimal material needed in the brace 37, the present arrangement is lightweight . . . and yet the beam 21 is strong, since the straps 38 and 39 connect the walls 25–28 together in multiple directions to prevent kinking and premature failure of the beam upon front impact. The components are relatively easily made and secured together, such that assembly time and cost is minimized. Notably, the beam 21 is stable even if impacted at an angle, due to the diagonal "truss-like" stability created by the diagonal straps. The energy absorbing sections 33, 40, 41, of the energy absorber that extend into the beam create additional stability. Further, the sequence caused upon a frontal impact results in a very predictable, stable, reliable crush, and results in excellent energy absorption and communication of controlled amounts of stress through the bumper system to the vehicle frame. Since a shape of the beam 21 is open and relatively easily formed, it can be made of ultra-high-strength materials, such as 190 KSI tensile strength martensite material. Also, the beam 21 can be swept to various longitudinal curvatures. The brace 37 is easily bendable to match a longitudinal curvature of the beam 21, such that the present arrangement is easily made, even where there is a sharply curved high degree of sweep in the beam 21.

It is noted that the bumper beam can be "W" shaped or "C" shaped or have another open cross-section and still have a similar strong structure. Further, the present inventive concepts include two C-shaped beams secured together with the straps positioned therebetween.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A bumper system for vehicles comprising:
   a beam having an open-sided cross section with top and bottom walls that are substantially parallel; and
   a brace including straps that extend diagonally back and forth between the top and bottom walls and that are securely attached to free ends of the top and bottom walls to secure the top and bottom walls together in a manner that prevent spreading apart upon a vehicle impact.

2. The bumper system defined in claim 1, including an energy absorber having at least one energy-absorbing section that extends through the brace to at least about half of a depth of the beam and that engage sides of the top and bottom walls.

3. The bumper system defined in claim 2, wherein the energy absorber includes crush boxes having four orthogonal sides and an open rear, the crush boxes being supported on a face of the beam.

4. The bumper system defined in claim 2, wherein at least one of the energy-absorbing sections includes a full-depth energy-absorbing section that extends into contact with a back wall of the energy absorber.

5. The bumper system defined in claim 2, wherein the energy absorber includes crush boxes made of polymeric material engaging a face of the beam.

6. The bumper system defined in claim 1, wherein the straps include a pair of parallel straps near an end of the beam that form a space therebetween.

7. The bumper system defined in claim 6, including an energy absorber having an energy-absorbing section that extends through the space at least partially into the beam.

8. The bumper system defined in claim 1, wherein the straps extend at an angle and at least two straps form part of a one-piece stamping.

9. The bumper system defined in claim 1, wherein the beam has a W-shaped cross section.

10. The bumper system defined in claim 1, wherein at least two of the straps are oppositely angled and are integrally formed as a one-piece stamping.

* * * * *